United States Patent [19]

Hoppert et al.

[11] 3,878,586

[45] Apr. 22, 1975

[54] CATFISH CLEANING BOARD

[76] Inventors: Jerome E. Hoppert, 7410 Main St., Lino Lakes, Minn. 55038; Thomas G. Wright, 9514 N. Shore Trl., Forest Lake, Minn. 55025

[22] Filed: May 17, 1974

[21] Appl. No.: 470,718

[52] U.S. Cl. ................................................. 17/70
[51] Int. Cl. ........................................... A22c 25/00
[58] Field of Search ............................ 17/70, 64, 66

[56] References Cited
UNITED STATES PATENTS

| | | | |
|---|---|---|---|
| 1,438,091 | 12/1922 | Bowe | 17/70 |
| 2,680,877 | 6/1954 | Thornton | 17/70 |
| 3,740,794 | 6/1973 | Smith | 17/70 |

*Primary Examiner*—Robert Peshock
*Attorney, Agent, or Firm*—Terryl K. Qualey

[57] ABSTRACT

A catfish cleaning board and a method for cleaning catfish utilizing the board. The board is formed with a longitudinal slot therethrough extending from one end of the board and having edge walls converging from one face of the board to a narrow opening through the board, and a two-jaw clamp is mounted on the face of the board with its clamping area perpendicular to the faces of the board and facing the open end of the slot. A catfish is placed on the board with its tail in the clamp, its head over the edge of the board and its body over the slot, a cut is made under the skin of the catfish generally parallel to the face of the board from behind the posterior fin to a position forward of the anterior fin and then through the spine of the catfish, and the head of the catfish is then moved downward to force the skin of the catfish through the slot and to remove the head and entrails.

3 Claims, 6 Drawing Figures

CATFISH CLEANING BOARD

FIELD of the INVENTION

The present invention relates to a fish cleaning board for cleaning catfish.

BACKGROUND OF THE INVENTION

There are many fish cleaning boards in the prior art as exemplified by those disclosed in U.S. Pat. Nos. 2,531,546; 3,015,841; 3,177,523 and 3,445,885. Such boards have been provided simply to assist in holding a slippery fish in a fixed position while it is being filleted or scaled.

Cleaning a catfish requires the removal of the skin, the head, the entrails and the fins. Generally this has been accomplished by nailing the head of the catfish to a wooden board, cutting the skin around the head of the catfish and pulling the skin from the body with a pair of pliers. The head, dorsal fins and tail fin are then cut off and the entrails removed. This has always been a tedious procedure.

SUMMARY OF THE INVENTION

The present invention provides a catfish cleaning board and a method for cleaning catfish. The catfish cleaning board comprises an elongate board formed with a longitudinal slot therethrough extending from one end of the board, the slot having a uniform cross-section with edge walls similarly converging from one face of the board to a narrow opening through the board, both edges at the juncture of the open end of the slot and said one end of the board being rounded. A two-jaw clamp is mounted on said one face of the board with the clamping area between the jaws extending perpendicular to the faces of the board, being aligned with the longitudinal slot and facing the open end of the slot. The clamp is adjustably positionable in a direction parallel to the slot to accomodate different length catfish.

The method utilizes the catfish cleaning board. A catfish is positioned upright on the board with the longitudinal center line of the catfish aligned with the center line of the slot and the head of the catfish extending beyond the end of the board from which the slot extends. The clamp is adjusted to position the clamping area thereof at the tail of the catfish and the tail of the catfish is clamped between the jaws of the clamp. A cut is then made under the skin of the catfish generally parallel to the faces of the board from behind the posterior fin to a position forward of the anterior fin and then through the spine of the catfish. Finally, the head of the catfish is moved downward to force the skin of the catfish through the slot and to remove the head and entrails of the catfish.

The catfish cleaning board and method of cleaning catfish of the present invention substantially reduce the labor involved in cleaning a catfish.

THE DRAWING

Figure 1:
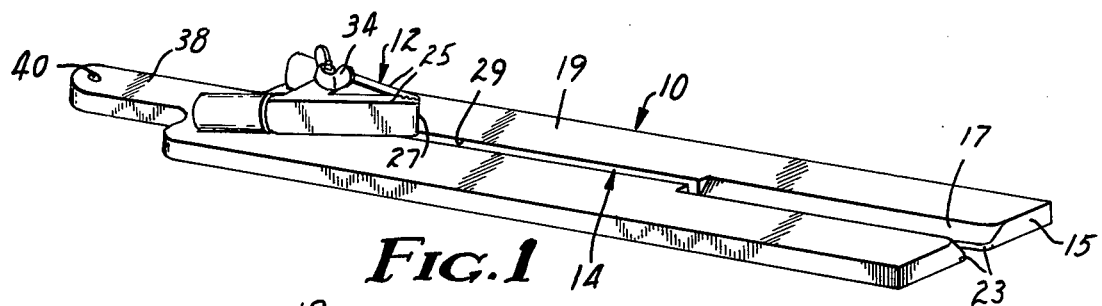
FIG. 1 is a perspective view illustrating the top, one edge and one end of a catfish cleaning board constructed in accordance with the present invention.
Figure 2:
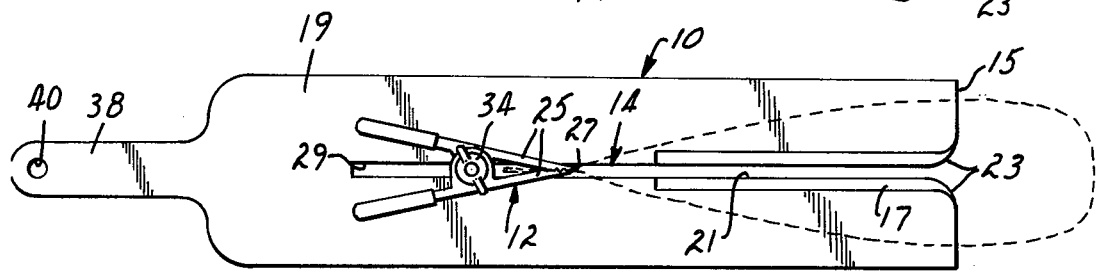
FIG. 2 is a top view of the board with a catfish illustrated in phantom lines thereon in position for cleaning.

The catfish cleaning board of the present invention includes an elongate board 10 and a spring-loaded, two-jaw clamp 12 mounted on the board.

The board 10 is formed with a longitudinal slot 14 therethrough extending from one end 15 of the board. The slot 14 has a uniform cross-section with edge walls 17 similarly converging from one face 19 of the board to a narrow opening 21 through the board. Both edges 23 at the juncture of the open end of the slot 14 and the end 15 of the board are rounded. The board 10 is formed of a rigid material to maintain the narrow opening 21 when pressure is applied to the converging edge walls 17. The material of the board is also preferably stain resistant and easy to clean. For example, a rigid plastic or hard wood may be used.

The spring-loaded, two-jaw clamp 12 is of conventional design, the jaws 25 being urged together by a spring. The clamp 12 is mounted on the upper face 19 of the board 10 with the clamping area 27 between the jaws 25 extending perpendicular to the faces of the board 10, being aligned with the longitudinal slot 14 and facing the open end of the slot.

The narrow portion 21 of the slot 14 is extended down the length of the board 10 to define a clamp mounting slot 29. A shaft 30 passes through the clamp and the slot 29 and is formed with a head 31 which is slidable along a recess 33 in the base of the board 10. The upper end of the shaft 30 is threaded and a wing nut 34 is turned onto the shaft 30 to tighten the clamp 12 onto the board 10. The clamp 12 is adjustably positionable in a direction parallel to the slot 14 by loosening the wing nut 34 and sliding the clamp and its mounting shaft 30 along the slot 29. The clamp is adjustable to accomodate catfish of different lengths.

Figure 4:
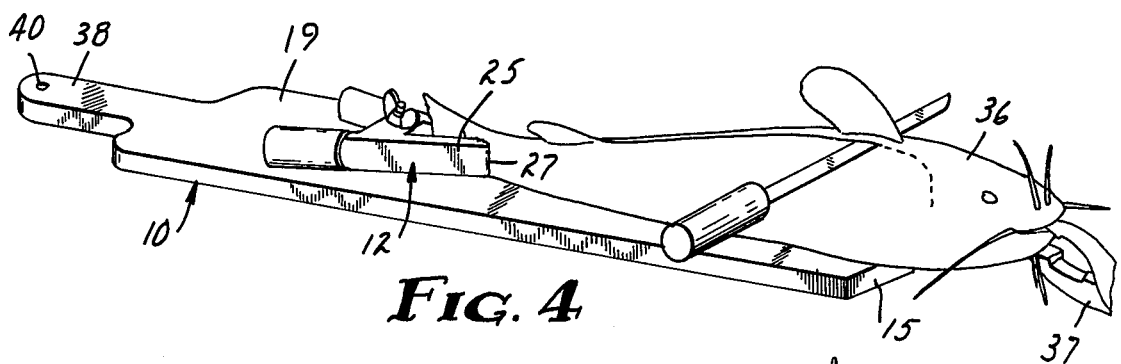
FIG. 4 is a perspective view like that of FIG. 1 with a catfish in position thereon and illustrating steps in the method of the present invention.
Figure 3:
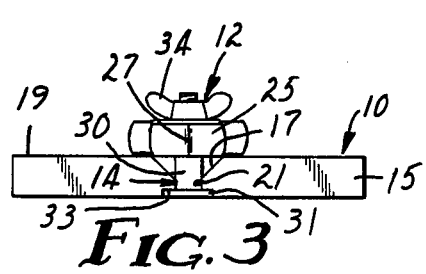
FIG. 3 is an end elevation view of the board.
Figure 5:
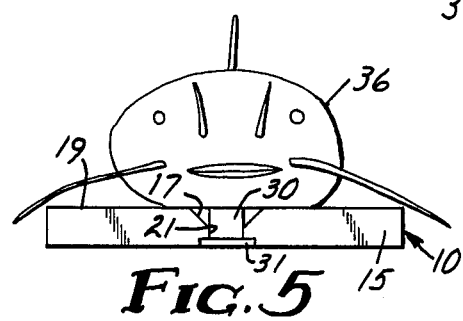
FIG. 5 is an end elevation view similar to that of FIG. 3 with a catfish on the board in position for cleaning.
Figure 6:
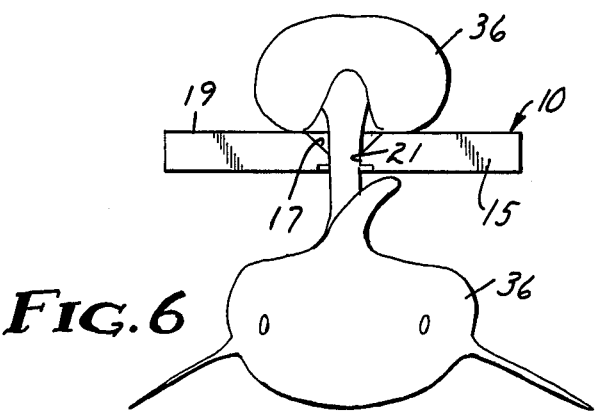
FIG. 6 is an end elevation view similar to that of FIG. 5 illustrating a step in the method of the present invention.

The fish cleaning board is used to practice the method of the present invention. The catfish 36 to be cleaned is positioned upright on the upper face 19 of the board 10 with the longitudinal center line of the catfish aligned with the centerline of the slot 14 and the head of the catfish extending beyond the end 15 of the board from which the slot 14 extends. The clamp 12 is adjusted along its mounting slot 29 to position the clamping area 27 thereof at the tail of the catfish and the tail of the catfish is clamped between the jaws 25 of the clamp 12. Next, as illustrated in FIG. 4, a cut is made under the skin of the catfish generally parallel to the faces of the board 10 from behind the posterior fin to a position forward of the anterior fin and then into the spine of the catfish; the spinal portion of the cut yet to be made in FIG. 4 being shown by a dotted line. Finally, the head of the catfish 36 is moved in a direction generally perpendicular to the faces of the board from the upper face 19 toward the lower face of the board to force the skin of the catfish through the slot 14 and to remove the head and entrails of the catfish. This is most easily accomplished by utilizing a pair of pliers 37 with which the lower lip or the entire head of the catfish is grasped and pulled downward (see FIGS. 4 and 6). Rounding of the edges 23 at the end of the slot 14 removes any sharp edges which might tear the skin and prevent it from being removed as a single piece from the catfish. All that remains to be removed to complete the cleaning operation is the tail of the catfish and perhaps a minor amount of entrails which may be left behind.

One specific embodiment of a fish cleaning board constructed in accordance with the present invention was constructed as illustrated in the drawings. The board 10 was formed from a piece of methyl methacrylate 0.5 inch thick, 4.75 inches wide and 25.25 inches long. The rectangular area was made 20 inches long and the end of the board removed from the slot 14 was reduced in width to form a handle 38. The narrow width of the slot 14 was made 0.25 inch wide and the width of the slot 14 at the upper face 19 of the board was 1.0 inch, the edge walls 17 of the slot 14 converging to the 0.25 inch width at an angle of 45°. The length of the slot 14 was made 8 inches and the clamp mounting slot 29 was also 8 inches. The edges 23 at the end of the slot 14 were rounded at a radius of 0.5 inch at the upper face 19 of the board and at a radius of 0.75 inch at and below the end of the converging edge walls 17. An additional 0.25 inch aperture 40 was formed through the handle 38 to permit the adjustable clamp 12 to be removed from its catfish cleaning position and bolted to the board through a hole in one handle thereof to position the clamping area 27 between its jaws parallel to the faces of the board for filleting or scaling fish other than catfish.

We claim:

1. A catfish cleaning board comprising: a board formed with a longitudinal slot therethrough extending from one end of said board, said slot having a uniform cross-section with edge walls similarly converging from one face of said board to a narrow opening through said board, both edges at the juncture of the open end of said slot and said one end of said board being rounded, said board permitting support of the body of a catfish in an upright position on said one face of said board with the longitudinal centerline of the catfish aligned with the centerline of said slot for cleaning of the catfish including pulling of the skin thereof through said slot, and a two-jaw clamp mounted on said one face of said board with the clamping area between said jaws extending perpendicular to the faces of said board, being aligned with said longitudinal slot and facing the open end of said slot to permit clamping of the tail of a catfish supported in an upright position on said one face of said board, said clamp being adjustably positionable in a direction parallel to said slot to accomodate different length catfish.

2. The fish cleaning board of claim 1 wherein said converging edge walls of said longitudinal slot lie at an angle of 45° to said one face of said board.

3. A method of cleaning catfish comprising:

providing a catfish cleaning board comprising a board formed with a longitudinal slot therethrough extending from one end of said board, said slot having a uniform cross-section with edge walls similarly converging from one face of said board to a narrow opening through said board, both edges at the juncture of the open end of said slot and said one end of said board being rounded, and a two-jaw clamp mounted on said one face of said board with the clamping area between said jaws extending perpendicular to the faces of said board, being aligned with said longitudinal slot and facing the open end of said slot, said clamp being adjustably positionable in a direction parallel to said slot, positioning a catfish to be cleaned upright on said one face of said board with the longitudinal centerline of the catfish aligned with the centerline of said slot and the head of the catfish extending beyond the end of said board from which said slot extends, adjusting said clamp to position the clamping area thereof at the tail of the catfish, clamping the tail of the catfish between the jaws of said clamp, cutting under the skin of the catfish generally parallel to the faces of said board from behind the posterior fin to a position forward of the anterior fin and then into the spine of the catfish, and moving the head of the catfish in a direction generally perpendicular to the faces of said board from said one face toward the opposed face to force the skin of the catfish through said slot and to remove the head and entrails of the catfish.

* * * * *